US012669601B2

(12) United States Patent       (10) Patent No.:    US 12,669,601 B2
Wosaibei et al.                      (45) Date of Patent:       Jun. 30, 2026

(54) METHODS AND SYSTEMS FOR ACOUSTIC DRIFT RUN

(71) Applicant: Saudi Arabian Oil Company, Dhahran (SA)

(72) Inventors: Abdullah Wosaibei, Al-Ahsa (SA); Hasan M. Jassem, Hofuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 323 days.

(21) Appl. No.: 18/582,062

(22) Filed: Feb. 20, 2024

(65) Prior Publication Data

US 2025/0264607 A1      Aug. 21, 2025

(51) Int. Cl.
*G01S 15/04*        (2006.01)
*G01S 7/527*        (2006.01)
*G01S 15/10*        (2006.01)
*G01S 15/89*        (2006.01)
*G01V 1/52*         (2006.01)

(52) U.S. Cl.
CPC ............ *G01S 15/04* (2013.01); *G01S 7/5273* (2013.01); *G01S 15/10* (2013.01); *G01S 15/8993* (2013.01); *G01V 1/52* (2013.01)

(58) Field of Classification Search
CPC .... G01S 15/8993; G01S 7/5273; G01S 15/04; G01S 15/10; G01V 1/52; G01V 1/50
See application file for complete search history.

(56) References Cited

U.S. PATENT DOCUMENTS 4,894,807 A  *  1/1990  Alam ........................ G01V 1/42
                                                          181/112
7,334,661 B2 *  2/2008  Pabon .................... G01V 1/523
                                                          181/102

(Continued)

FOREIGN PATENT DOCUMENTS

WO    WO-2010151136 A1 * 12/2010   ............... G01V 1/52
WO    WO-2016016186 A1 *  2/2016   ........... E21B 47/107

OTHER PUBLICATIONS

Kim et al., "Simulation Based Investigation of Focusing Phased Array Ultrasound in Dissimilar Metal Welds", Nuclear Engineering and Technology, vol. 48, pp. 228-235, 2016.

*Primary Examiner* — Abdallah Abulaban
*Assistant Examiner* — Amie M Ndure
(74) *Attorney, Agent, or Firm* — Dinsmore & Shohl LLP

(57)      ABSTRACT

Methods of and systems for evaluating accessibility inside a wellbore may include a transducer connected to a wave-generating unit and an analyzing unit, which are all disposed above the wellbore. The method may include emitting at least one acoustic wave through the transducer disposed above the wellbore; propagating the at least one acoustic wave downwards in the wellbore; contacting the at least one acoustic wave with a wellbore object, and thereby producing at least one echo wave propagating upwards in the wellbore; receiving the at least one echo wave through the transducer disposed above the wellbore; analyzing the at least one echo wave and thereby determining the object depth; and comparing the object depth ($D_O$) with a target depth ($D_T$), and thereby evaluating the accessibility inside the wellbore.

17 Claims, 3 Drawing Sheets

(56)        References Cited

U.S. PATENT DOCUMENTS

| | | | | |
|---|---|---|---|---|
| 11,808,908 | B2 * | 11/2023 | Guedes | E21B 49/00 |
| 2005/0000279 | A1 * | 1/2005 | Yogeswaren | G01N 29/2462 |
| | | | | 73/152.58 |
| 2005/0173185 | A1 * | 8/2005 | Pabon | G01V 1/523 |
| | | | | 181/108 |
| 2010/0059219 | A1 * | 3/2010 | Roberts | E21B 47/0025 |
| | | | | 166/250.01 |
| 2012/0179377 | A1 * | 7/2012 | Lie | E21B 47/107 |
| | | | | 73/152.58 |
| 2021/0247538 | A1 * | 8/2021 | Guedes | G01S 15/8945 |
| 2024/0175349 | A1 * | 5/2024 | Seren | G01V 1/168 |
| 2024/0329270 | A1 * | 10/2024 | Mizuno | G01V 1/003 |

* cited by examiner

200
FIG. 2A
210
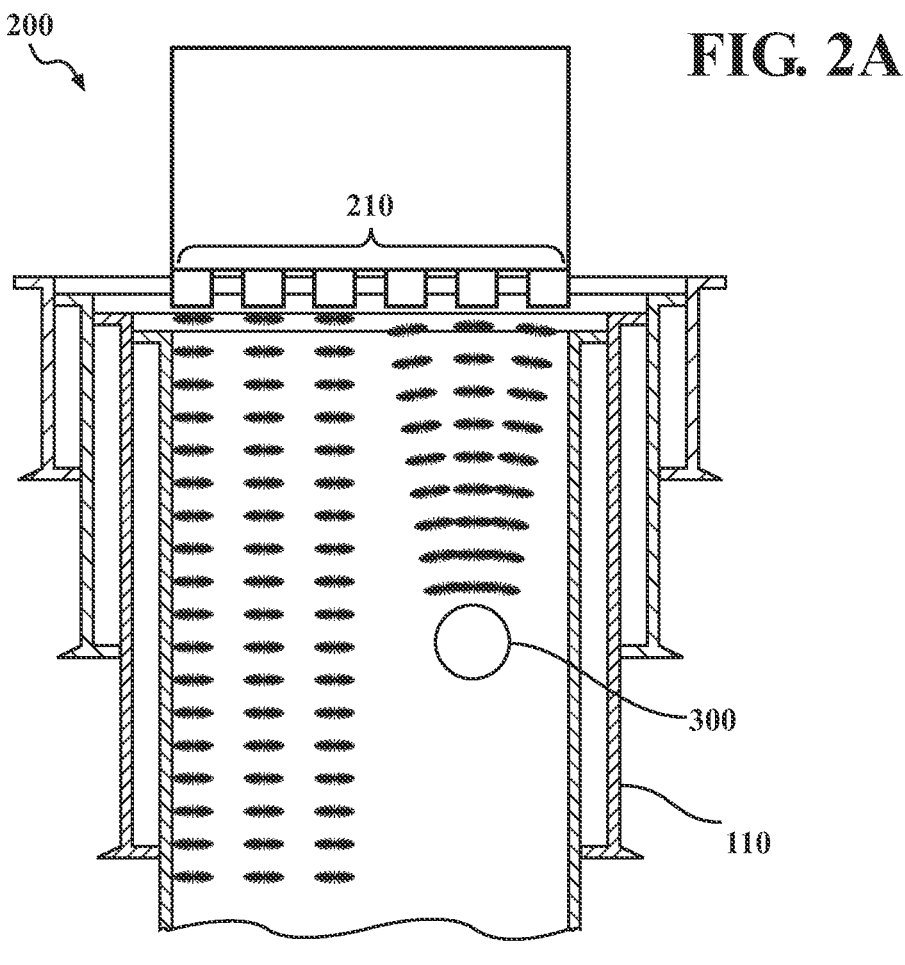
300
110
210
T1      T2      T3              Tn
$\Delta d_{12}$    $d_1$    $d_2$        $d_3$
$d_n$
300
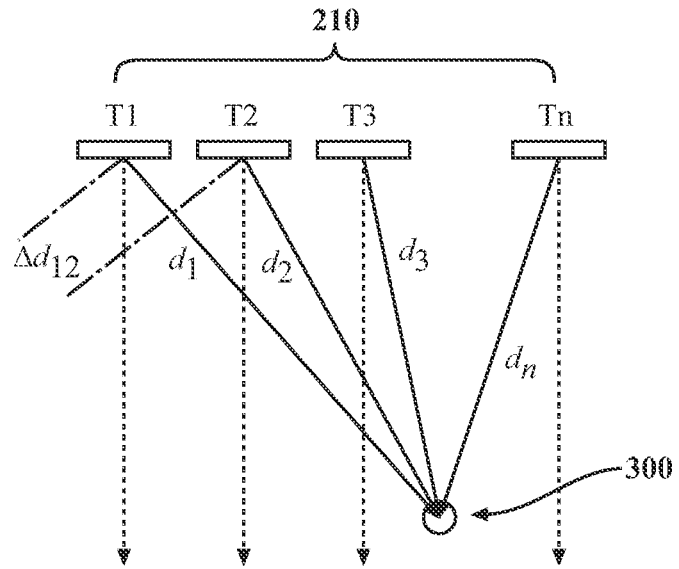
FIG. 2B

METHODS AND SYSTEMS FOR ACOUSTIC DRIFT RUN

FIELD

The present disclosure relates to methods and systems for drift runs using acoustic energy.

BACKGROUND

In the oil and gas industry, well interventions are often performed to increase well production efficiency or to maintain well operation. For example, a well intervention may be performed when parts of the well (e.g. tubing strings) need maintenance or replacement. Prior to performing a well intervention, a gauge-cutter drift run is performed to assess wellbore clearance and confirm the wellbore diameter. During the gauge-cutter drift run, a slickline-attached gauge cutter is lowered into the well, and well clearance is confirmed if the gauge cutter reaches a target depth.

However, during a drift run, a gauge cutter may become stuck due to various reasons. For example, obstructions such as deposits or paraffin may be present within the tubing. While a gauge cutter is designed to cut and clear obstructions from within the tubing, if the obstructions are too large or too hard, they may cause the gauge cutter or equipment to become stuck. Also, during a drift run, tagging issues due to unexpected changes or anomalies (e.g., formation damage and lost circulation) within the wellbore may occur and cause the tool to become stuck. Once a tool become stuck, immediate recovery operations to retrieve the tool are required. If immediate operations are not available or are unsuccessful, there can be considerable production delay, and the stuck tool can cause severe damage to the wellbore or even loss of the well.

Accordingly, a need exists for methods and systems for evaluation of wellbore clearance.

SUMMARY

Embodiments of the present disclosure address this need by utilizing acoustic waves of a high frequency greater than or equal to 10,000 Hz to determine a wellbore clearance, and in particular, by analyzing the reflections of high-frequency acoustic waves to generate an analytical picture about the wellbore clearance.

In accordance with one embodiment of the present disclosure, a system for evaluating accessibility inside the wellbore may comprise a transducer connected to a wave-generating unit and a analyzing unit, wherein the transducer, the wave-generating unit, and the analyzing unit are disposed above the wellbore; the wave-generating unit is configured to emit at least one acoustic wave through the transducer into the wellbore; the at least one acoustic wave propagates downwards in the wellbore and produces at least one echo wave upon contacting a wellbore object at an object depth ($D_O$); the at least one echo wave propagates upwards in the wellbore; and the analyzing unit is configured to receive the at least one echo wave through the transducer.

In accordance with one embodiment of the present disclosure, a method of evaluating accessibility inside a wellbore may comprise providing the system for evaluating accessibility inside the wellbore described herein, propagating at least one acoustic wave downwards in the wellbore; contacting the at least one acoustic wave with a wellbore object, and thereby producing at least one echo wave propagating upwards in the wellbore; receiving the at least one echo wave; analyzing the at least one echo wave and thereby determining an object depth ($D_O$); and comparing the object depth ($D_O$) with a target depth ($D_T$), and thereby evaluating the accessibility inside the wellbore.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2A illustrates a transducer comprising a phased array; and

FIG. 2B is a schematic representing the method of steering elements of the phased array to focus acoustic waves.

DETAILED DESCRIPTION

As used throughout this disclosure, the terms "downward" and "upward" may refer to a position within a wellbore relative to the surface, with upward indicating a direction or position closer to the surface and downward referring to a direction or position farther away from the surface.

As described in the present disclosure, a "geologic formation" may refer to a body of rock that is sufficiently distinctive and continuous from the surrounding rock bodies that the body of the rock may be mapped as a distinct entity. A geologic formation is, therefore, sufficiently homogenous to form a single identifiable unit containing similar properties throughout the geologic formation, including, but not limited to, porosity and permeability.

As used throughout this disclosure, "wellbore," may refer to a drilled hole or borehole extending from the surface of the Earth down to the geologic formation, including the openhole or uncased portion.

Figure 1A:
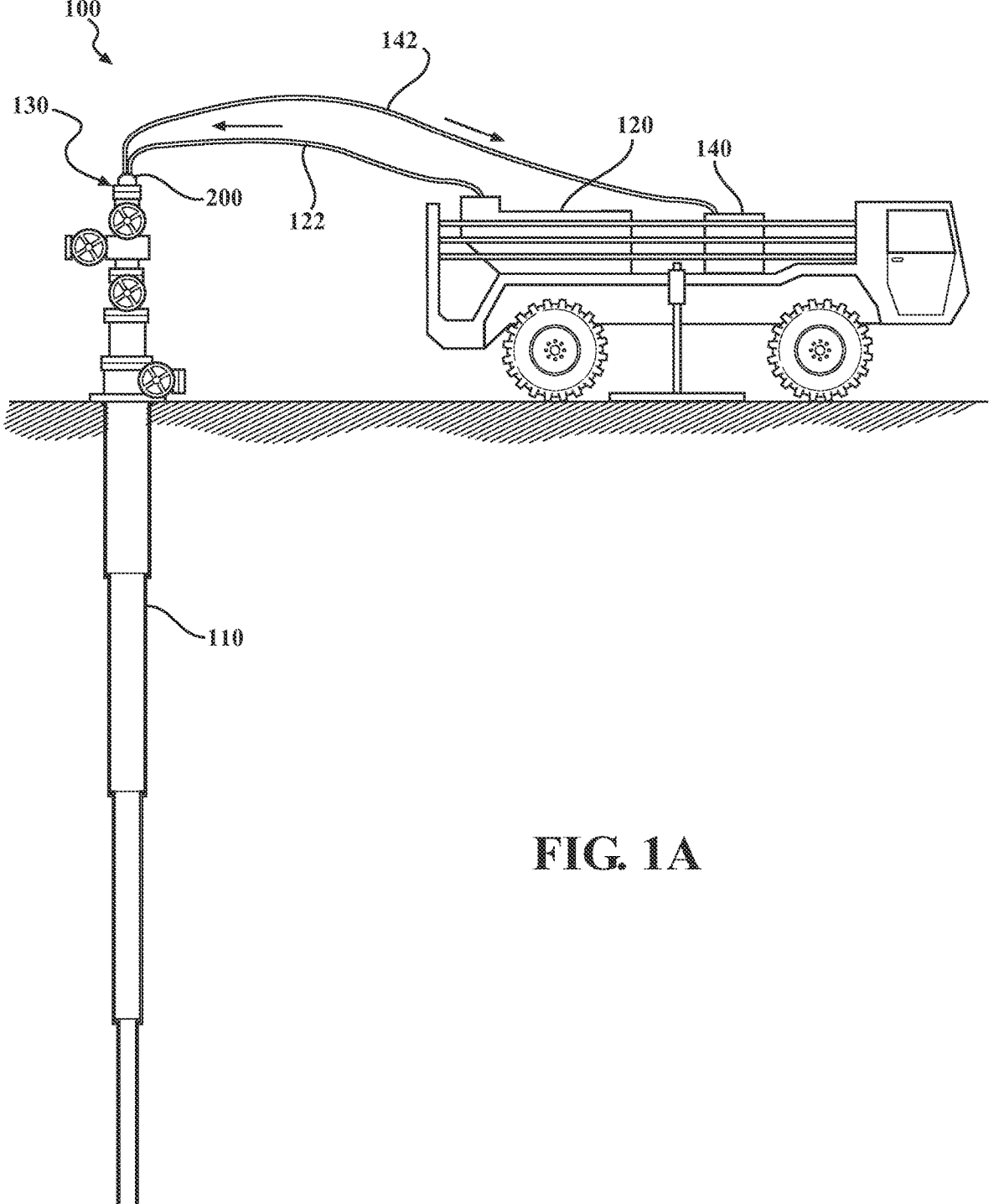
FIG. 1A illustrates a system for evaluating wellbore accessibility.
Figure 1B:
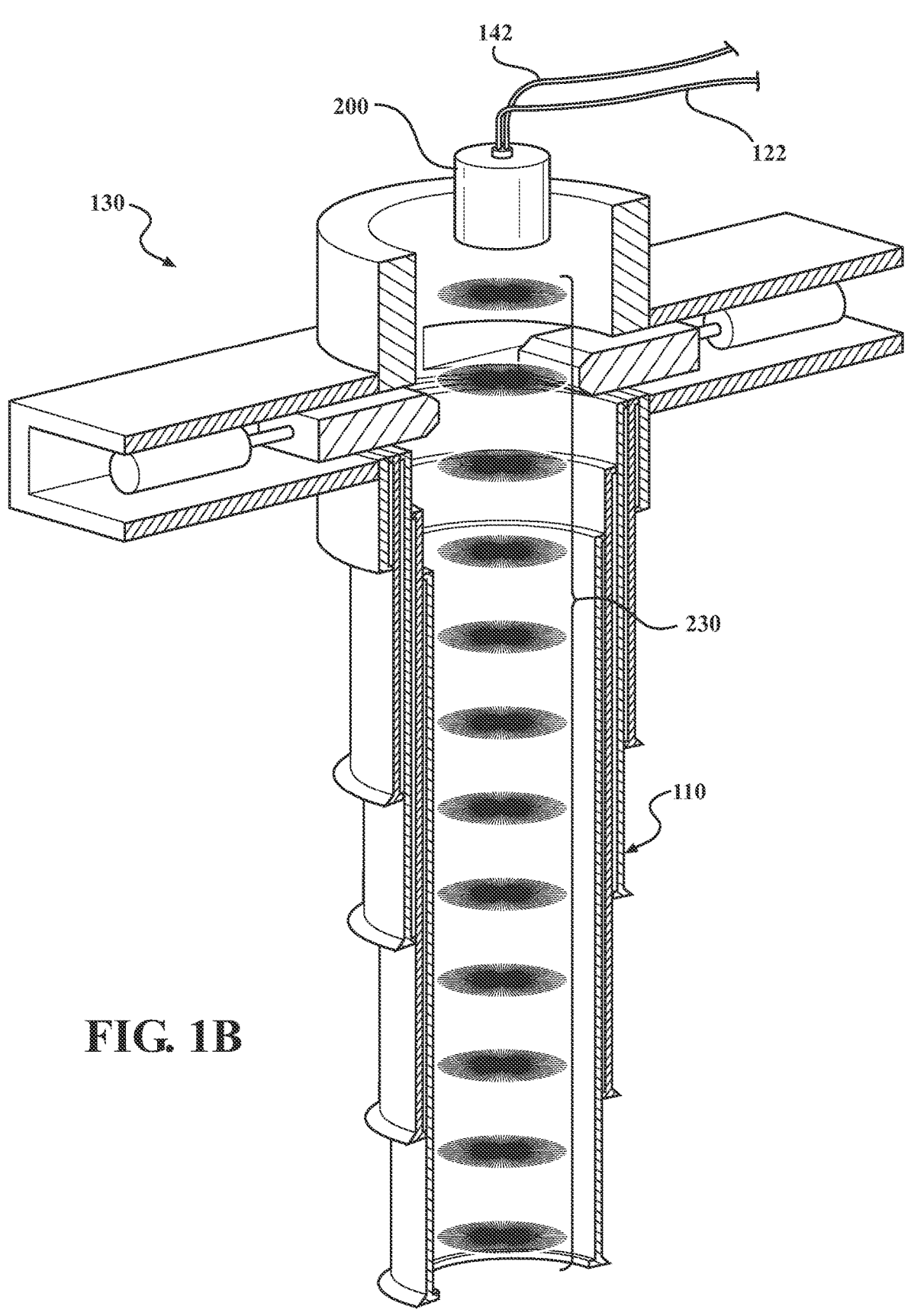
FIG. 1B illustrates a cross-sectional view of the system and depicts the method of evaluating wellbore accessibility using acoustic energy.

Referring initially to FIGS. 1A and 1B, and in embodiments, a system 100 for evaluating accessibility inside a wellbore 110 may comprise a transducer 200 connected to a wave-generating unit 120 and an analyzing unit 140. The transducer 200, the wave-generating unit 120, and the analyzing unit 140 may be disposed above the wellbore 110. The wave-generating unit 120 may be configured to emit at least one acoustic wave 230 through the transducer 200 into the wellbore 110. The at least one acoustic wave may propagate downwards in the wellbore and, upon contacting a wellbore object at an object depth ($D_O$), produce at least one echo wave, which may propagate upwards in the wellbore 110. The analyzing unit 140 may be configured to receive the at least one echo wave through the transducer 200 and to analyze the at least one echo wave. Optionally, the system may further comprise a blowout preventer 130, and the transducer may be disposed in the blowout preventer 130.

According to embodiments, the wave-generating unit 120 and transducer 200 may be configured to emit the at least one acoustic wave 230 of at least one acoustic frequency from 10 kHz to 100 kHz, such as from 10 kHz to 90 kHz, from 10 kHz to 80 kHz, from 10 kHz to 70 kHz, from 10 kHz to 60 kHz, from 10 kHz to 50 kHz, from 10 kHz to 40 kHz, from 10 kHz to 30 kHz, from 10 kHz to 20 kHz, from 20 kHz to 100 kHz, from 20 kHz to 90 kHz, from 20 kHz to 80 kHz, from 20 kHz to 70 kHz, from 20 kHz to 60 kHz, from 20 kHz to 50 kHz, from 20 kHz to 40 kHz, from 20 kHz to 30 kHz, from 30 kHz to 100 kHz, from 30 kHz to 90 kHz, from 30 kHz to 80 kHz, from 30 kHz to 70 kHz, from 30 kHz to 60 kHz, from 30 kHz to 50 kHz, from 30 kHz to 40 kHz, from 40 kHz to 100 kHz, from 40 kHz to 90 kHz, from 40 kHz to 80 kHz, from 40 kHz to 70 kHz, from 40 kHz to 60 kHz, from 40 kHz to 50 kHz, from 50 kHz to 100 kHz, from 50 kHz to 90 kHz, from 50 kHz to 80 kHz, from 50 kHz to 70 kHz, from 50 kHz to 60 kHz, from 60 kHz to 100 kHz, from 60 kHz to 90 kHz, from 60 kHz to 80 kHz, from 60 kHz to 70 kHz, from 70 kHz to 100 kHz, from 70 kHz to 90 kHz, from 70 kHz to 80 kHz, from 80 kHz to 100 kHz, from 80 kHz to 90 kHz, or from 90 kHz to 100 kHz.

In some embodiments, the wave-generating unit 120 and transducer 200 may be configured to simultaneously emit multiple acoustic waves 230 of multiple frequencies. For example, as shown in FIG. 2A and in embodiments, the transducer may comprise a phased array comprising a plurality of elements 210, wherein each of the phased array elements is configured to individually emit the at least one acoustic wave. In some embodiments, all of the phased array elements may emit acoustic waves at the same frequency. In other embodiments, a portion of the phased array elements may emit acoustic waves at a first frequency while the other portion of the phased array elements may emit acoustic waves at a second frequency.

In some embodiments, the phased array may comprise from 16 to 512 elements, such as from 16 to 256 elements, from 16 to 128 elements, from 16 to 64 elements, from 16 to 32 elements, from 32 to 512 elements, from 32 to 256 elements, from 32 to 128 elements, from 32 to 64 elements, from 64 to 512 elements, from 64 to 256 elements, from 64 to 128 elements, from 128 to 512 elements, from 128 to 256 elements, or from 256 to 512 elements.

In some embodiments, each of the phased array elements may individually emit the at least one acoustic wave at an emission angle relative to a longitudinal axis of the wellbore. For example, and in some embodiments, the emission angle may be from 0° to 60°, such as from 0° to 50°, from 0° to 40°, from 0° to 30°, from 0° to 20°, from 0° to 10°, from 10° to 60°, from 10° to 50°, from 10° to 40°, from 10° to 30°, from 10° to 20°, from 20° to 60°, from 20° to 50°, from 20° to 40°, from 20° to 30°, from 30° to 60°, from 30° to 50°, from 30° to 40°, from 40° to 60°, from 40° to 50°, or from 50° to 60°.

As shown in FIG. 2A, and in some embodiments, each of the phased array elements may be steered to individually emit the at least one acoustic wave at various emission angles. For example, and in embodiments, a portion of the phased array elements are steered to an emission angle of 0° relative to a longitudinal axis of the wellbore and emit a plurality beam of acoustic waves parallel to the longitudinal axis of the wellbore. For another example, and in other embodiments, a portion of the phased array elements are steered to converge at a focal plane at the target depth ($D_T$), the object depth ($D_O$), or a combination thereof, as illustrated in FIG. 2A. In further embodiments, the focal plane may be further steered horizontally where an object 300 is located.

In some embodiments, each of the phased array elements may individually emit the at least one acoustic wave at a time delay of from 0 µs to 20 µs, such as from 0 µs to 15 µs, 0 µs to 10 µs, from 0 µs to 8 µs, from 0 µs to 6 µs, from 0 µs to 4 µs, from 0 µs to 2 µs, from 2 µs to 20 µs, from 2 µs to 15 µs, 2 µs to 10 µs, from 2 µs to 8 µs, from 2 µs to 6 µs, from 2 µs to 4 µs, from 4 µs to 20 µs, from 4 µs to 15 µs, 4 µs to 10 µs, from 4 µs to 8 µs, from 4 µs to 6 µs, from 6 µs to 20 µs, from 6 µs to 15 µs, 6 µs to 10 µs, from 6 µs to 8 µs, from 8 µs to 20 µs, from 8 µs to 15 µs, 8 µs to 10 µs, from 10 µs to 20 µs, from 10 µs to 15 µs, or from 15 µs to 20 µs.

In other embodiments, each of the phased array elements is configured to individually receive the at least one echo wave. In further embodiments, the analyzing unit is configured to analyze the at least one echo wave received by each of the phased array elements and determine a distance (d) between the object 300 and each of the phased array elements, as illustrated in FIG. 2B.

In further embodiments, the wave-generating unit 120 and transducer 200 may be configured to emit the at least one acoustic wave 230 at a pulse-repetition rate of from 1 to 1000 pulses per second, such as from 1 to 800 pulses per second, from 1 to 600 pulses per second, from 1 to 400 pulses per second, from 1 to 200 pulses per second, from 1 to 100 pulses per second, from 1 to 50 pulses per second, from 1 to 20 pulses per second, from 1 to 10 pulses per second, from 1 to 5 pulses per second, from 5 to 1000 pulses per second, from 5 to 800 pulses per second, from 5 to 600 pulses per second, from 5 to 400 pulses per second, from 5 to 200 pulses per second, from 5 to 100 pulses per second, from 5 to 50 pulses per second, from 5 to 20 pulses per second, from 5 to 10 pulses per second, from 10 to 1000 pulses per second, from 10 to 800 pulses per second, from 10 to 600 pulses per second, from 10 to 400 pulses per second, from 10 to 200 pulses per second, from 10 to 100 pulses per second, from 10 to 50 pulses per second, from 10 to 20 pulses per second, from 20 to 1000 pulses per second, from 20 to 800 pulses per second, from 20 to 600 pulses per second, from 20 to 400 pulses per second, from 20 to 200 pulses per second, from 20 to 100 pulses per second, from 20 to 50 pulses per second, from 50 to 1000 pulses per second, from 50 to 800 pulses per second, from 50 to 600 pulses per second, from 50 to 400 pulses per second, from 50 to 200 pulses per second, from 50 to 100 pulses per second, from 100 to 1000 pulses per second, from 100 to 800 pulses per second, from 100 to 600 pulses per second, from 100 to 400 pulses per second, from 100 to 200 pulses per second, from 200 to 1000 pulses per second, from 200 to 800 pulses per second, from 200 to 600 pulses per second, from 200 to 400 pulses per second, from 400 to 1000 pulses per second, from 400 to 800 pulses per second, from 400 to 600 pulses per second, from 600 to 1000 pulses per second, from 600 to 800 pulses per second, or from 800 to 1000 pulses per second.

References will now be made in detail to embodiments of methods of evaluating accessibility inside a wellbore utilizing the systems described hereinabove.

To evaluate the accessibility inside the wellbore, according to embodiments, the methods disclosed herein may comprise providing the system described herein above, propagating the at least one acoustic wave 230 downwards in the wellbore; contacting the at least one acoustic wave with the wellbore object, and thereby producing the at least one echo wave propagating upwards in the wellbore; receiving the at least one echo wave; analyzing the at least one echo wave, and thereby determining the object depth ($D_O$); and comparing the object depth ($D_O$) with a target depth ($D_T$), and thereby evaluating the accessibility inside the wellbore 110. As used herein, target depth may mean the depth of a tool pre-installed or to be installed or deployed. The target depth may also mean the total depth of the wellbore. In embodiments where the transducer comprises a phased array, the methods may further comprise steering the emission angle of each of the phased array elements.

To analyze the at least one echo wave, for example, the analyzing unit 140 may analyze the at least one echo wave to determine the travel time. As used herein, "travel time" refers to the total duration for the at least one acoustic wave 230 to travel from the transducer 200 to the wellbore object and the at least one echo wave to return from the wellbore object to the transducer 200. The travel time may be used to determine the object depth according to Equation (1):

$$D_O = V \times t_{1/2} \tag{1}$$

wherein $D_O$ is the object depth, V is the acoustic wave velocity, and $t_{1/2}$ is half of the travel time. Without being bound by any particular theory, the acoustic wave velocity may vary when the waves pass through mediums with different impedances. Therefore, the acoustic wave velocity determined by the analyzing unit 140 may comprise a velocity deviation $\delta_V$ and thus a distribution $V=\tilde{V}\pm\delta_V$. $\tilde{V}$ may be the average velocity, the median velocity, or other measurements of central tendency of the acoustic wave velocity. $\delta_V$ is the deviation in the acoustic wave velocity. Similarly, the half-travel time determined by the analyzing unit 140 may comprise a half travel-time deviation $\delta_t$ and thus a distribution $t_{1/2}=\tilde{t}_{1/2}\pm\delta_t$ or $t_{1/2}=D/V\pm\delta_t$. $\tilde{t}_{1/2}$ may be the average half-travel time, the median half-travel time, or other measurements of central tendency of the half-travel time. $\delta_t$ is the deviation in the half-travel time.

In embodiments, the methods disclosed herein may further comprise determining a half-travel time of the at least one echo wave and categorizing the at least one echo wave based on the half-travel time. That is, based on the determined travel time, the at least one echo wave may be categorized as a confirming wave, a short-trip wave, or a dissipated wave.

As used herein, the confirming wave means that the at least one acoustic wave contacts the wellbore object at the target depth ($D_T$) and returns the at least one echo wave therefrom. The confirming wave may comprise a half-travel time greater than or equal to $D_T/V-\delta_t$ and less than or equal to $D_T/V+\delta_t$. As used herein, the short-trip wave means that the at least one acoustic wave contacts the wellbore object at the object depth ($D_O$) above the target depth ($D_T$) and returns the at least one echo wave therefrom. The short-trip wave may comprise a half-travel time less than $D_T/V-\delta_t$. As used herein, the dissipated wave means that the at least one acoustic wave contacts the wellbore object at the object depth ($D_O$) below the target depth ($D_T$) and returns the at least one echo wave therefrom. The dissipated wave may comprise a half-travel time greater than $D_T/V+\delta_t$. In some embodiments, the dissipated wave may not return to the transducer 200.

Additionally, the at least one acoustic wave may comprise an initial intensity distribution over the cross-sectional area of the wellbore, and thus the at least one acoustic wave may comprise a return intensity distribution. According to embodiments, the methods disclosed herein may further comprise determining the return intensity distribution of the at least one echo wave.

As stated above, the at least one echo wave may be the confirming wave, the short-trip wave, the dissipated wave, or combinations thereof. Therefore, in embodiments, the return intensity distribution may comprise a confirming-wave intensity distribution, a dissipated-wave intensity distribution, a short trip-wave intensity distribution, or combinations thereof.

To discern the confirming-wave intensity distribution, the dissipated-wave intensity distribution, and/or the short trip-wave intensity distribution, the methods disclosed herein may further comprise correlating the half-travel time and the return intensity distribution of the at least one echo wave, and thereby discerning the confirming-wave intensity distribution, the dissipated-wave intensity distribution, the short trip-wave intensity distribution, or combinations thereof.

Further, according to embodiments, the method disclosed herein may comprise establishing a baseline profile of the at least one acoustic wave, and therefore a baseline picture of the wellbore. The baseline profile of the at least one acoustic wave and the baseline picture of the wellbore may be generated when a component or a tool is pre-installed at the target depth ($D_T$) in the then-unobstructed wellbore. In embodiments, the baseline profile may include a baseline velocity distribution, a baseline half-time distribution, and/or a baseline intensity distribution of the at least one acoustic wave.

To improve the accuracy of the evaluation, according to embodiments, the method disclosed herein may further comprise comparing the baseline profile with the half-travel time of the at least one echo wave, and thereby determine whether an obstruction is present inside the wellbore.

In embodiments, if the at least one echo wave has a half-travel time falls in the range of $D_T/\tilde{V}\pm\delta_t$, one may determine that the at least one echo wave is reflected off the pre-installed component at the target depth ($D_T$) and the wellbore is essentially free of obstructions. In some embodiments, if the at least one echo wave has a half-travel time that falls outside the range of $D_T/\tilde{V}\pm\delta_t$, this may indicate that the condition inside the wellbore may have been changed. For example, if the at least one echo wave has a half-travel time less than $D_T/\tilde{V}-\delta_t$, this may indicate that the at least one echo wave is reflected off the wellbore object located above the pre-installed component at the target depth ($D_T$). This may indicate that the wellbore object is a newly-formed deposit or obstruction above the target depth. For another example, if the at least one echo wave has a half-travel time greater than $D_T/\tilde{V}+\delta_t$, this indicates that the at least one echo wave may be reflected off the wellbore object located below the target depth ($D_T$). This may indicate that the pre-installed tool might have misaligned or moved downwards in the wellbore.

If comparing the baseline profile of the at least one acoustic wave with the half-travel time of the at least one echo wave determines that the half-travel time of the at least one echo wave falls outside the range of $D_T/\tilde{V}\pm\delta_t$, according to embodiments, the methods disclosed herein may further comprise determining the wellbore object's dimension, horizontal location, and/or composition.

The intensity distribution of the at least one echo wave may provide a cross-sectional picture of the wellbore, which may be indicative of the wellbore object's dimension, horizontal location, and/or composition. Therefore, in embodiments, the methods disclosed herein may further comprise mapping the baseline intensity distribution to establish a baseline picture of the wellbore clearance, mapping the return intensity distribution to establish a current picture of the wellbore clearance, and comparing the baseline picture with the current picture to determine the wellbore object's dimension, horizontal location, and/or composition.

Further, once the baseline profile has been established, one may assess the wellbore clearance periodically and monitor the varying condition inside the wellbore. Therefore, in embodiments, the methods disclosed herein may further comprise monitoring a change in the wellbore clearance or the accessibility inside the wellbore. Similarly, the methods disclose herein may further comprise monitoring changes in the wellbore object's dimension, horizontal location, and/or composition.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative or qualitative comparison, value, measurement, or other representation.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." Likewise, utilization of the terms "having", "has", or their equivalents should likewise be interpreted in like manner as the more commonly used open-ended preamble term "comprising."

What is claimed is:

1. A method of evaluating accessibility inside a wellbore, comprising:

providing a system for evaluating accessibility inside the wellbore, comprising a transducer connected to a wave-generating unit and an analyzing unit, wherein;

the transducer, the wave-generating unit, and the analyzing unit are disposed above the wellbore;

the wave-generating unit is configured to emit at least one acoustic wave through the transducer into the wellbore;

the at least one acoustic wave propagates downwards in the wellbore and produces at least one echo wave upon contacting a wellbore object at an object depth $(D_O)$;

the at least one echo wave propagates upwards in the wellbore; and the analyzing unit is configured to receive the at least one echo wave through the transducer;

propagating the at least one acoustic wave downwards in the wellbore;

contacting the at least one acoustic wave with the wellbore object, and thereby producing the at least one echo wave propagating upwards in the wellbore;

receiving the at least one echo wave;

analyzing the at least one echo wave and thereby determining the object depth; and comparing the object depth $(D_O)$ with a target depth $(D_T)$, and thereby evaluating the accessibility inside the wellbore.

2. The method of claim 1, further comprising determining a half-travel time of the at least one echo wave and categorizing the at least one echo wave based on the half-travel time, wherein:

the at least one echo wave is categorized as a confirming wave, a dissipated wave, or a short-trip wave;

the confirming wave comprises a half-travel time greater than or equal to $D_T/V-\delta_t$ and less than or equal to $D_T/V+\delta_t$, wherein V is an acoustic wave velocity (V) of the at least one acoustic wave, and $\delta_t$ is a deviation in the half-travel time of the at least one echo wave received at the analyzing unit;

the short-trip wave comprises a half-travel time less than $D_T/V-\delta_t$; and the dissipated wave comprises a half-travel time greater than $D_T/V+\delta_t$.

3. The method of claim 2, further comprising determining a return intensity distribution of the at least one echo wave, wherein the return intensity distribution comprises a confirming-wave intensity distribution, a dissipated-wave intensity distribution, a short trip-wave intensity distribution, or combinations thereof; and correlating the half-travel time and the return intensity distribution of the at least one echo wave, and thereby discerning the confirming-wave intensity distribution, the dissipated-wave intensity distribution, the short trip-wave intensity distribution, or combinations thereof.

4. The method of claim 2, further comprising establishing a baseline profile of the at least one acoustic wave and a baseline picture of an unobstructed wellbore comprising a pre-installed component at the target depth $(D_T)$, wherein the baseline profile comprises a baseline velocity distribution, a baseline half-time distribution, and/or a baseline intensity distribution of the at least one acoustic wave.

5. The method of claim 4, further comprising comparing the baseline profile of the at least one acoustic wave with the half-travel time of the at least one echo wave, and thereby determining whether the half-travel time of the at least one echo wave falls outside the range of from $D_T/\tilde{V}-\delta_t$ to $D_T/\tilde{V}+\delta_t$.

6. The method of claim 4, further comprising:

mapping the baseline intensity distribution, and thereby establishing the baseline picture of wellbore clearance;

mapping the return intensity distribution, and thereby establish a current picture of the wellbore clearance; and comparing the baseline picture with the current picture, and thereby determining the wellbore object's dimension, horizontal location, and/or composition.

7. The method of claim 2, further comprising monitoring a change in the accessibility inside the wellbore.

8. The method of claim 2, further comprising monitoring changes in the wellbore object's dimension, horizontal location, and/or composition.

9. The method of claim 1, wherein the at least one acoustic wave comprises a frequency of from 10 to 100 kHz.

10. The method of claim 1, wherein the transducer comprises a phased array comprising a plurality of elements, wherein each of the phased array elements is configured to individually emit the at least one acoustic wave.

11. The method of claim 10, wherein each of the phased array elements is configured to individually emit the at least one acoustic wave at a frequency of from 10 to 100 kHz, at a time delay of from 0 µs to 20 µs, and/or at an emission angle of from 0° to 60° relative to a longitudinal axis of the wellbore.

12. The method of claim 11, further comprising steering the emission angle of each of the phased array elements.

13. The method of claim 12, wherein a portion of the phased array elements are steered to an emission angle of 0° relative to a longitudinal axis of the wellbore and emit a plurality beam of acoustic waves parallel to the longitudinal axis of the wellbore.

14. The method of claim 12, wherein a portion of the phased array elements are steered to converge at a focal plane at the target depth ($D_T$), the object depth ($D_O$), or a combination thereof.

15. The method of claim 10, wherein each of the phased array elements is configured to individually receive the at least one echo wave.

16. The method of claim 15, wherein the analyzing unit is configured to analyze the at least one echo wave received by each of the phased array elements and determine a distance (d) between the object and each of the phased array elements.

17. The method of claim 1, wherein the system further comprises a blowout preventer, and the transducer is disposed in the blowout preventer.

* * * * *